(12) United States Patent
Kim et al.

(10) Patent No.: US 9,896,787 B2
(45) Date of Patent: Feb. 20, 2018

(54) POLYESTER SEWING THREAD FOR AIRBAG AND PREPARATION METHOD THEREOF

(71) Applicant: KOLON INDUSTRIES, INC., Gwacheon-si, Gyeonggi-do (KR)

(72) Inventors: Jae-Hyung Kim, Yongin-si (KR); Hyung-Keun Kim, Yongin-si (KR); Sang Mok Lee, Yongin-si (KR); Dong-Jin Kwak, Yongin-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 248 days.

(21) Appl. No.: 14/648,552

(22) PCT Filed: Nov. 29, 2013

(86) PCT No.: PCT/KR2013/011004
§ 371 (c)(1),
(2) Date: May 29, 2015

(87) PCT Pub. No.: WO2014/084662
PCT Pub. Date: Jun. 5, 2014

(65) Prior Publication Data
US 2015/0308019 A1 Oct. 29, 2015

(30) Foreign Application Priority Data
Nov. 30, 2012 (KR) ........................ 10-2012-0138347

(51) Int. Cl.
*D02G 3/28* (2006.01)
*D02G 3/46* (2006.01)
(Continued)

(52) U.S. Cl.
CPC ............. *D02G 3/28* (2013.01); *B60R 21/235* (2013.01); *D01F 6/62* (2013.01); *D02G 3/045* (2013.01);
(Continued)

(58) Field of Classification Search
CPC .......... D02G 3/045; D02G 3/36; D02G 3/402; D02G 3/404; D02G 3/46; D01F 6/62
See application file for complete search history.

(56) References Cited

U.S. PATENT DOCUMENTS 4,656,825 A * 4/1987 Negishi ............... D02G 1/0213
57/208
5,637,114 A 6/1997 Hohnke
(Continued)

FOREIGN PATENT DOCUMENTS

EP 0597958 B1 2/1998
JP 6134218 A 2/1986
(Continued)

OTHER PUBLICATIONS

European Patent Office, Communication dated Oct. 24, 2016, in counterpart European Application No. 13859123.5.
(Continued)

*Primary Examiner* — Shaun R Hurley
(74) *Attorney, Agent, or Firm* — Sughrue Mion, PLLC (57) ABSTRACT

A polyester sewing thread usable for a fabric for an airbag and a cushion for an airbag is provided. The polyester sewing thread is obtained by doubling and twisting a specific polyester yarn including a plurality of polyester filaments, and bonding the polyester yarn in the manner of in-bonding, out-bonding, or in-and-out bonding. A method for producing the thread is also disclosed.

10 Claims, 4 Drawing Sheets

(51) Int. Cl.
*D02G 3/04* (2006.01)
*D02G 3/36* (2006.01)
*D02G 3/40* (2006.01)
*B60R 21/235* (2006.01)
*D01F 6/62* (2006.01)

(52) U.S. Cl.
CPC ............... *D02G 3/36* (2013.01); *D02G 3/402* (2013.01); *D02G 3/404* (2013.01); *D02G 3/46* (2013.01); *D10B 2331/04* (2013.01); *D10B 2505/124* (2013.01)

(56) References Cited

U.S. PATENT DOCUMENTS

| | | | | |
|---|---|---|---|---|
| 6,351,933 | B1* | 3/2002 | Reuter | B60C 9/0042 57/211 |
| 6,458,725 | B1 | 10/2002 | Masuda et al. | |
| 7,562,684 | B2* | 7/2009 | Nakagawa | B60C 9/0007 152/451 |
| 2006/0213176 | A1* | 9/2006 | Gebauer | D02G 3/46 57/243 |
| 2008/0014816 | A1 | 1/2008 | Schmitt et al. | |
| 2012/0003472 | A1* | 1/2012 | Stuckey | D02G 3/443 428/374 |
| 2013/0033027 | A1 | 2/2013 | Kim et al. | |
| 2013/0224468 | A1 | 8/2013 | Kim et al. | |

FOREIGN PATENT DOCUMENTS

| | | |
|---|---|---|
| KR | 10-2004-0094232 A | 11/2004 |
| KR | 10-2011-0109116 A | 10/2011 |
| KR | 1020120029955 A | 3/2012 |
| WO | 2011122801 A2 | 10/2011 |

OTHER PUBLICATIONS

International Searching Authority, International Search Report of PCT/KR2013/011004 dated Mar. 20, 2014.

* cited by examiner

POLYESTER SEWING THREAD FOR AIRBAG AND PREPARATION METHOD THEREOF

CROSS REFERENCE TO RELATED APPLICATIONS

This application is a National Stage of International Application No. PCT/KR2013/011004, filed Nov. 29, 2013, claiming priority based on Korean Patent Application No. 10-2012-0138347, filed Nov. 30, 2012, the contents of all of which are incorporated herein by reference in their entirety.

BACKGROUND OF THE INVENTION (a) Field of the Invention

The present invention relates to a polyester sewing thread usable for fabric for an airbag, and a preparation method thereof. In particular, the present invention relates to a polyester sewing thread for an airbag capable of not only having excellent sewing performance when a specific polyester yarn is applied to a fabric for an airbag, but also maintaining packaging of air tightness of an airbag cushion and exhibiting excellent shape stability when the airbag cushion is unfolded.

(b) Description of the Related Art

Generally, an airbag refers to a device to protect drivers and passengers upon a head-on collision of a vehicle driving at a speed of about 40 km/h or more by sensing a collision impact to the vehicle with an impact sensor, and then exploding gunpowder to supply gas into the airbag, thereby inflating the airbag. A structure of a general airbag system is as shown in FIG. 1.

Figure 1:
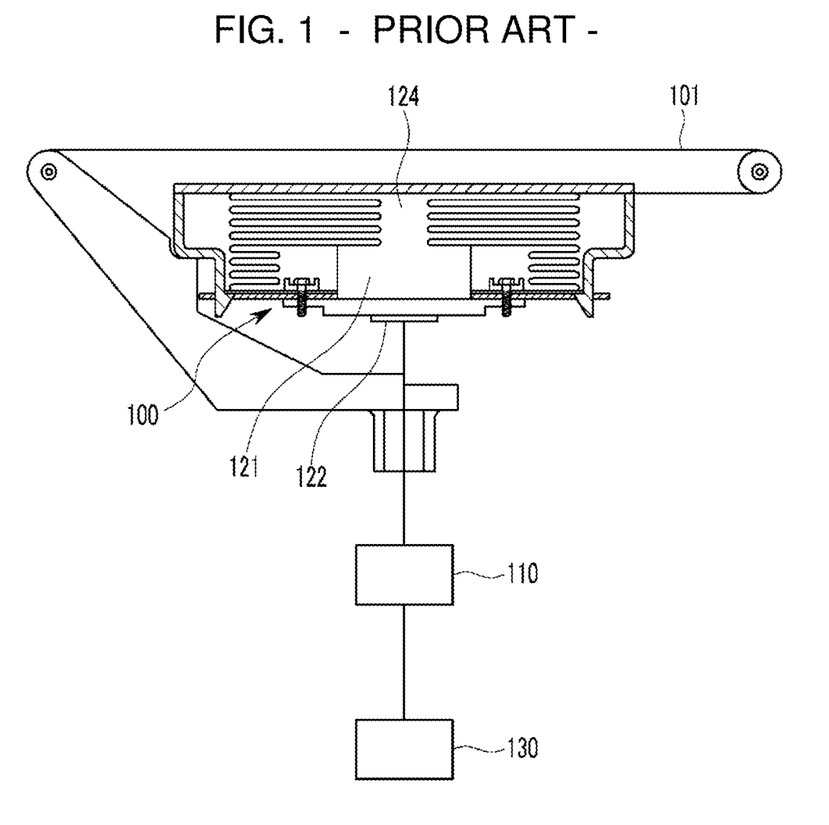
FIG. 1 represents a general airbag system.
Figure 2:
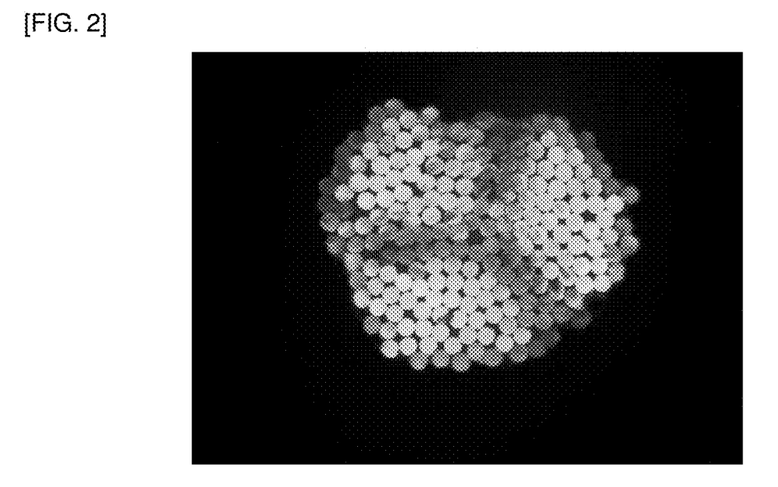
FIG. 2 is a cross-sectional optical image of a polyester sewing thread prepared in the manner of in-and-out bonding according to Example 3 of the present invention.
Figure 3:
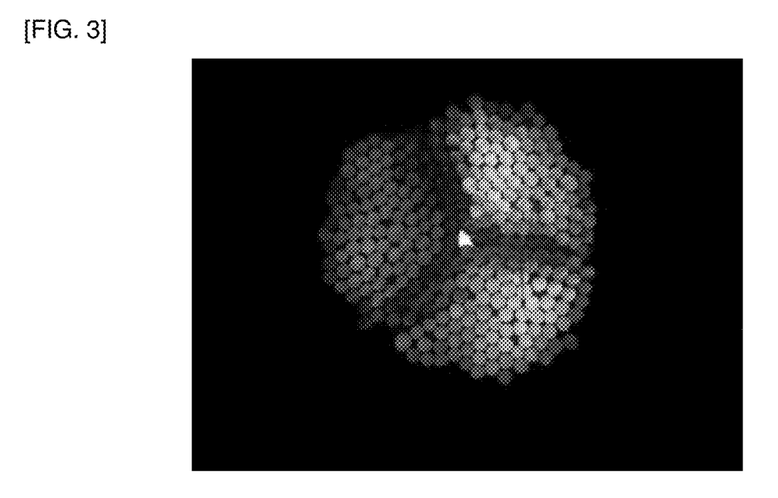
FIG. 3 is a cross-sectional optical image of a polyester sewing thread prepared in the manner of in-bonding according to Example 1 of the present invention.
Figure 4:
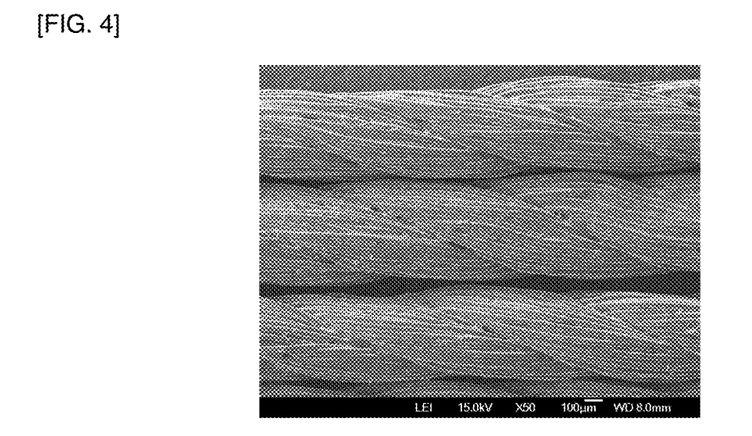
FIG. 4 is a scanning electron microscope (SEM) lateral image of a polyester sewing thread prepared in the manner of in-and-out bonding according to Example 3 of the present invention.
Figure 5:
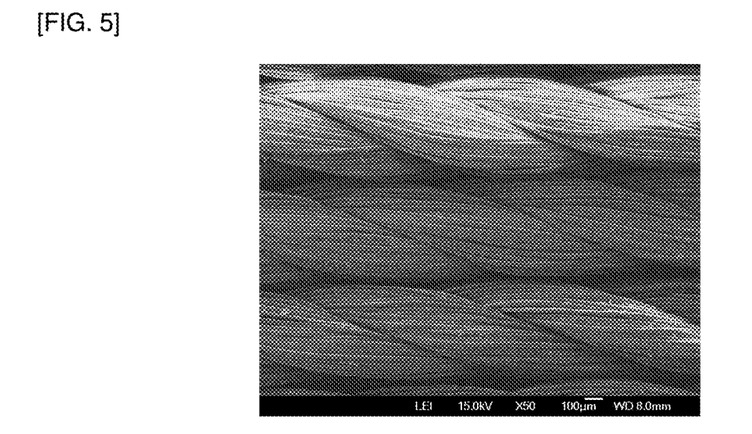
FIG. 5 is a scanning electron microscope (SEM) lateral image of a polyester sewing thread prepared in the manner of in-bonding according to Example 1 of the present invention.

As shown in FIG. 1, a general airbag system is configured to include an airbag cushion module 100 including an inflator 121 generating a gas by ignition of a detonator 122, and an airbag 124 expanded and unfolded towards the driver in a driver's seat by the generated gas, and mounted on a steering wheel 101; an impact sensor 130 generating an impact signal at collision; and an electronic control module 110 igniting the detonator 122 of the inflator 121 by the impact signal. In the airbag system as configured above, when a vehicle collides head-on, the impact sensor 130 senses an impact to transmit a signal to the electronic control module 110. Herein, the electronic control module 110 recognizing the signal, and ignites the detonator 122 to burn a gas generator inside the inflator 121. The thus-burned gas generator inflates the airbag 124 through rapid gas generation. The expanded and unfolded airbag 124 thus contacts the frontal upper body of the driver to partly absorb an impact load caused by collision, and in a case where the head and the chest of the driver move to the front by inertia to collide with the inflated airbag 124, the gas in the airbag 124 is rapidly emitted through an emission hole formed in the airbag 124, and acts as a buffer to the front of the driver. Thus, a secondary injury may be reduced by effectively buffering an impact force transmitted to the driver upon frontal collision.

As described above, the airbag cushion used in a vehicle is prepared in a predetermined shape and is installed in a steering wheel, side windows, or side pillars of the vehicle in a folded state so as to minimize volume thereof. The airbag cushion is fixed to a vehicle body by using a tab portion and the like while being maintained in a folded state, and when the inflator 121 operates, the airbag cushion is expanded and unfolded. Here, even though it is a short time, high temperature gas having a temperature of about 300° C. to 700° C. is generally generated into the airbag by the inflator. Therefore, for the fabric for an airbag such as nylon or the like, a heat resistant polymer layer made of silicone, chloroprene rubber, or the like, is formed at an inner side surface of the fabric for an airbag to protect the airbag from the high temperature gas.

As existing sewing threads for an airbag, a polyamide fiber (nylon 66, nylon 46) sewing thread and an aramid (p-aramid) sewing thread are widely used; however, they are disadvantageous in view of a cost as compared to a sewing thread for an airbag to which a polyester yarn is applied. Currently, the sewing thread to which the polyester yarn is applied is widely used for clothing and industrial products; however, it is not applied to airbag products for protecting passengers in a vehicle upon a vehicle collision accident. The existing polyester sewing thread has limitations in being applied as a sewing thread for an airbag due to low yarn toughness, which is a basic physical property needed for being used as a sewing thread for an airbag, as well as insufficient heat resistance and stiffness as compared to nylon sewing thread. In addition, upon a static test of a cushion manufactured by sewing the existing polyester sewing thread on the airbag cushion, problems such as melting, cutting, deterioration, and the like of the sewing thread by high temperature and high pressure gas of the inflator may occur, and a fabric at a sewing part is also expanded, such that it is not usable for the airbag cushion.

Therefore, research on development of a polyester sewing thread for an airbag capable of having a highly competitive price, excellent sewing performance, and excellent stability even under high temperature and high pressure gas conditions of the inflator when the airbag is unfolded so as to be effectively used for a fabric and a cushion for an airbag is required.

SUMMARY OF THE INVENTION

The present invention has been made in an effort to provide a polyester sewing thread for an airbag capable of minimizing damage of sewing parts of a fabric and a cushion for an airbag and having excellent sewing performance even under strong pressure and high temperature conditions when an airbag is unfolded.

In addition, the present invention has been made in an effort to provide a preparation method of the polyester sewing thread for an airbag.

An exemplary embodiment of the present invention provides a polyester sewing thread for an airbag obtained by doubling and twisting a polyester yarn including a plurality of polyester filaments and having tensile strength of 7.8 g/d or more, elongation at break of 13% to 27%, dry heat shrinkage of 7% or less, boiling water shrinkage of 5% or less, and melted heat capacity of 35 J/g or more, and bonding the polyester yarn in the manner of in-bonding, out-bonding, or in-and-out bonding.

The polyester sewing thread for an airbag may have a total fineness of 200 to 2,400 denier.

The polyester yarn may have a denier per filament of 2.0 to 8.0 DPF, and may include 20 to 180 strands of filaments.

The polyester yarn may have a number average molecular weight of 100,000 to 250,000, an intrinsic viscosity of 0.8 dl/g or more, crystallinity of 40% to 60%, and an initial modulus of 40 to 120 g/d.

A toughness index Y according to Calculation Formula 1 below may be 1.0 to 4.0.

$$Y=(S\times E)/D \qquad \text{[Calculation Formula 1]}$$

In Calculation Formula 1, S represents tensile tenacity N of the polyester sewing thread, E represents tensile elongation (%) of the polyester sewing thread, and D represents total fineness (denier) of the polyester sewing thread.

Another exemplary embodiment of the present invention provides a preparation method of a polyester sewing thread for an airbag, the preparation method including: doubling and twisting a polyester yarn including a plurality of polyester filaments; and bonding the polyester yarn in the manner of in-bonding, out-bonding, or in-and-out bonding, wherein the polyester yarn has tensile strength of 7.8 g/d or more, elongation at break of 13% to 27%, dry heat shrinkage of 7% or less, boiling water shrinkage of 5% or less, and melted heat capacity of 35 J/g or more.

The polyester yarn may be doubled and twisted so that a twisting degree is 200 to 700 TPM.

The in-bonding may be performed by doubling and twisting a low melting point polymer yarn having a melting point of 150° C. to 220° C. at a center position of the polyester yarn after an upper twist is finished.

The out-bonding may be performed by coating a polymer resin for bonding on an outer side of the polyester yarn after an upper twist is finished, the polymer resin for bonding having a melting point of 150° C. to 220° C.

The in-and-out-bonding may be performed by doubling and twisting a low melting point polymer yarn having a melting point of 150° C. to 220° C. at a center position of the polyester yarn after an upper twist is finished, and then coating a polymer resin for bonding on an outer side of the doubled and twisted polyester yarn, the polymer resin for bonding having a melting point of 150° C. to 220° C.

EFFECTS OF THE INVENTION

According to the present invention, a polyester sewing thread obtained by doubling and twisting a polyester fiber having high strength, middle elongation, and dry heat shrinkage, and bonding the polyester fiber in the manner of in-bonding, out-bonding, or in-and-out bonding, is used to secure excellent durability and heat resistance even under severe conditions of high temperature and high pressure, thereby ensuring excellent work stability during a process and having excellent unfolding performance and packaging properties when the airbag is unfolded.

DETAILED DESCRIPTION OF THE EMBODIMENTS

Hereinafter, a polyester sewing thread for an airbag according to a specific exemplary embodiment of the present invention, a preparation method thereof, and an airbag cushion for a vehicle manufactured by using the same will be described in more detail. However, this is presented as an illustration of the present invention, and does not limit the scope of protection of the invention. It is obvious to a person skilled in the art that various modifications of the exemplary embodiment are possible within the scope of protection of the invention.

Additionally, unless specifically indicated herein, "comprising" or "containing" refers to include any constitutional element (or constitutional ingredient) without specific limitations, and it should not be interpreted as excluding the addition of other constitutional elements (or constitutional ingredients).

According to the present invention, a sewing thread obtained by doubling and twisting a specific polyester yarn, and bonding the polyester yarn in the manner of in-bonding, out-bonding, or in-and-out bonding, is used at the time of manufacturing the airbag cushion, such that excellent durability and heat resistance may be exhibited even under severe conditions of high temperature and high pressure upon expansion of the airbag, thereby preventing gas leakage and improving air tightness of the airbag cushion, while simultaneously securing excellent shape stability.

In the case of existing sewing thread used for an airbag cushion, a polyamide fiber (Nylon 66) is mostly used. In the past, there was an attempt to apply an industrial polyester (PET) yarn as the sewing thread; however, when the cushion was actually manufactured, filaments configuring the sewing thread were broken due to low physical strength of the sewing thread, a low bonding effect of the sewing thread, and low heat resistance of the sewing thread. In addition, loop formation related to shape stability as the sewing thread was non-uniform occurred, and upon evaluation for performance of the cushion which is a final product, the sewing thread was broken or melted, such that there was a limitation in it being used as the sewing thread for an airbag.

According to the present invention, a polyester chip having an intrinsic viscosity of 1.05 to 2.00 is used to apply the polyester sewing thread having high strength, middle elongation, and dry heat shrinkage as the sewing thread for an airbag, thereby implementing excellent physical properties similar to those of a sewing thread using an existing polyamide yarn (Nylon 66), and implementing sufficient performance as a sewing thread for an airbag when conducting a static test after the cushion for an airbag is actually manufactured. Therefore, the present invention provides a polyester sewing thread for an airbag having excellent performance and a highly competitive price to be used as a substitute for existing polyamide (Nylon 66) sewing thread for an airbag.

According to an embodiment of the present invention, the polyester sewing thread usable for a fabric and a cushion for an airbag is provided. The polyester sewing thread for an airbag is obtained by doubling and twisting a polyester yarn including a plurality of polyester filaments and having tensile strength of 7.8 g/d or more, elongation at break of 13% to 27%, dry heat shrinkage of 7% or less, boiling water shrinkage of 5% or less, and melted heat capacity of 35 J/g or more, and bonding the polyester yarn in the manner of in-bonding, out-bonding, or in-and-out bonding.

In the present invention, the sewing thread for an airbag refers to a sewing thread used in all sewing parts of the cushion at the time of manufacturing the airbag cushion for a vehicle, wherein both of lock stitching and chain stitching may be used.

The polyester sewing thread to be developed in the present invention may be applied to both of the fabric for an airbag and the cushion for an airbag, and particularly, when the cushion for an airbag is manufactured by using the polyester fabric and cushion, optimum sewability of sewing parts and physical properties may be provided, and as compared to the existing polyester sewing thread, strength, elongation, seam strength, and heat resistance may be improved, while similar properties to the existing polyamide sewing thread may be obtained.

The polyester sewing thread of the present invention uses a bundle of filaments of polyester yarn including a plurality of polyester filaments, and the multi-filaments of polyester fiber are upper-twisted and lower-twisted to prepare a doubled and twisted polyester thread. In particular, the present invention is characterized by performing a bonding treatment in the manner of in-bonding, out-bonding, or in-and-out bonding so as to increase binding power among filaments in a process of preparing the polyester doubled and twisted thread.

The polyester yarn preferably includes polyethylene terephthalate (PET) as a main component. Here, the PET may include various additives added thereto in a preparation process thereof. The PET may be included at at least 70 mol % or more, more preferably 90 mol % or more, in order to secure excellent mechanical physical properties as the sewing thread for an airbag. Hereinafter, the term polyethylene terephthalate (PET) means 70 mol % or more of a polyethylene terephthalate (PET) polymer without specific explanation.

In particular, the polyester yarn including the plurality of polyester filaments in the sewing thread for an airbag according to the present invention may have tensile strength of 7.8 g/d or more or 7.8 g/d to 11.0 g/d, and preferably 8.3 g/d or more or 8.3 g/d to 10.0 g/d. The tensile strength of the yarn is a factor directly related to tensile tenacity of the sewing thread. When the tensile strength is less than 7.8 g/de, suitable strength for the sewing thread for an airbag may not be obtained, and the tensile strength is preferably 7.8 g/de or more in view of seam strength of the cushion for an airbag actually using the sewing thread of the present invention and shape stability when the airbag is fully unfolded.

Further, in addition to the above-described high strength, the polyester yarn may have an elongation at break of 13% to 27%, and preferably 15% to 25%. The elongation at break of the yarn is a factor directly related to elongation of the sewing thread. When the elongation at break is less than 13%, the sewing thread itself is excessively rigid and loop formation at the time of sewing a round part of the cushion for an airbag is very poor, and therefore the elongation at break needs to be 13% or more to adjust twist and tension balance in a process of preparing the sewing thread. When the elongation at break is 27% or more, the sewing thread may be straightened due to tension generated in sewing, and puckering which is a phenomenon in which fabric of the cushion for an airbag shrinks during a process in which the sewing thread is elongated and recovered after the loop formation may occur.

The polyester yarn may have dry heat shrinkage of 7% or less or 0.8% to 7%, preferably 6% or less, and more preferably 5.5% or less. Here, the dry heat shrinkage is a value obtained by measurement under condition in which a fixed load of 0.01 g/d is applied at 177° C. for 2 minutes. The yarn in the process of preparing the sewing thread for an airbag of the present invention is subjected to a number of heat treatments, and when the dry heat shrinkage of the yarn is more than 7%, strength of the sewing thread may be deteriorated due to excessive shrinkage during the heat treatment, and the sewing thread is rigid, so the loop formation at the time of sewing the round part of the cushion is deteriorated.

In addition, the polyester yarn may have boiling water shrinkage of 5% or less or 0.8% to 5%, preferably 4% or less, and more preferably 3% or less. Here, the boiling water shrinkage is a value obtained by performing heat treatment in boiling water at 95° C. for 30 minutes, applying a fixed load of 0.1 g/d, and measuring a yarn length change between pre-treatment and post-treatment. In the sewing thread of the present invention, the boiling water shrinkage of the yarn needs to be 5% or less in order to exhibit uniform color and excellent appearance of the sewing threads in an inner layer and an outer layer by preparation processes such as dyeing (for example, cheese package dyeing), and the like.

Further, the polyester yarn may have a melted heat capacity of 35 J/g or more or 35 to 62 J/g, preferably 38 J/g or more, and more preferably 41 J/g or more. The melted heat capacity refers to a value of melted heat capacity generated by raising the temperature of a 10 mg sample from 30° C. up to 280° C. at a heating rate of 10° C./min under a nitrogen atmosphere by using DSC (Differential Scanning Calorimeter) equipment. The melted heat capacity of the polyester yarn is a factor directly affecting heat resistance of the sewing thread for an airbag. The polyester yarn including the plurality of polyester filaments needs to have a heat capacity of 35 J/g or more in order to not melt the sewing thread under the high temperature and high pressure gas of the inflator when the airbag is unfolded.

As described above, the sewing thread of the present invention is obtained by doubling and twisting the polyester yarn having elongation at break, dry heat shrinkage, boiling water shrinkage, and the like at an optimum range, together with excellent tensile strength, melted heat capacity, and the like, and bonding the polyester yarn. Therefore, the sewing thread of the present invention may manufacture the cushion for an airbag capable of minimizing damage of sewing parts of a fabric and a cushion for an airbag, preventing gas leakage, and improving air tightness, while simultaneously maintaining excellent shape stability even under strong pressure and high temperature condition when the airbag is unfolded.

In addition, the polyester yarn may have fineness of 60 to 850 denier, and preferably 80 to 800 denier. The fineness of the polyester yarn may be 60 denier or more in view of strength and elongation of the sewing thread, and may be 850 denier or less in view of stiffness and sewability of the sewing thread. Here, the polyester yarn may have a denier per filament (DPF) of 2.0 or more or 2.0 to 8.0, and preferably 2.5 or more or 2.5 to 7.4, wherein the DPF of the polyester yarn may be 2.0 DPF or more in view of quality and toughness of the sewing thread, and may be 8.0 DPF or less in view of sewability and flexibility of the sewing thread. In addition, the polyester yarn may include 20 to 180 strands of filaments, and preferably 24 to 160 strands of filaments. The number of filaments of the polyester yarn may be 20 or more in view of quality and 180 or less in view of flexibility of the sewing thread.

In the sewing thread for an airbag according to the present invention, the polyester yarn may have a number average molecular weight of 100,000 to 250,000, and preferably 120,000 to 230,000. A number average molecular weight of the polyester yarn may be 100,000 or more in view of toughness and long-term aging physical property, and may be 250,000 or less in view of guarantee of uniform quality.

The existing polyester yarn generally exhibits a high modulus; however, the polyester yarn of the present invention has high tenacity and a low modulus by differentiation of a melt spinning process and an elongation process, wherein the modulus is an initial modulus that is lower than that of the polyester industrial yarn known in the art. In particular, in a case of the polyester yarn, a modulus (Young's modulus) of the yarn measured according to the ASTM D 885 method may be an initial modulus of 40 to 120 g/d, preferably 50 to 100 g/d, and more preferably 55 to 95 g/d. In addition, the polyester yarn in the present invention may have minimized elongation together with the low modulus. That is, when 1.0 g/d of stress is applied to the polyester yarn at room temperature, 0.4% or more or 0.4% to 1.8%, and preferably 0.7% or more or 0.7% to 1.5% of the polyester yarn may be elongated, and when 4.0 g/d of stress is applied to the polyester yarn at room temperature, 3.5% or more or 3.5% to 20%, and preferably 4.0% or more or 4.0% to 18% of the polyester yarn may be elongated, while when 7.0 g/d of stress is applied to the polyester yarn at room temperature, 6.0% or more or 6.0% to 25%, and preferably 7.0% or more or 7.0% to 23% may be elongated. Due to the low initial modulus and low elongation, the polyester yarn may exhibit excellent performance so that the sewing thread is not ripped or expansion of the fabric at a sewing part does not occur when the airbag is unfolded, as compared to the existing polyester sewing thread for an airbag including existing industrial yarn having a high modulus and low stiffness.

At the same time, the polyester yarn may have more improved intrinsic viscosity as compared to the polyester yarn in the art, that is, 0.8 dl/g or more or 0.8 dl/g to 1.2 dl/g, preferably 0.85 dl/g or more, and more preferably 0.90 dl/g or more. When the sewing thread for an airbag is prepared by using the polyester yarn, the intrinsic viscosity is preferably in the above-described range in order to exhibit excellent toughness required for enduring the high temperature and high pressure gas of the inflator and to maintain shape of the cushion for an airbag when the airbag is unfolded.

In particular, when the intrinsic viscosity of the yarn is 0.8 dl/g or more, high tenacity physical properties may be exhibited at a low elongation ratio, which is because orientation and crystallinity are increased in a direction of a fiber axis due to high intrinsic viscosity (high molecular weight). When the intrinsic viscosity of the yarn is 0.8 dl/g or less, the physical properties may inevitably be exhibited with high elongation. When the high elongation is applied as described above, orientation of the yarn may be increased, but a high modulus may be obtained. Therefore, it is preferable to maintain the intrinsic viscosity of the yarn to be 0.8 dl/g or more to apply low elongation, thereby making it possible to exhibit a low modulus. In addition, when the intrinsic viscosity of the polyester yarn is more than 1.2 dl/g, elongation tension is increased in an elongation process to cause problems during the process. Therefore, the intrinsic viscosity is more preferably 1.2 dl/g or less. In particular, the polyester yarn in the sewing thread of the present invention maintains a high level of intrinsic viscosity as described above, such that when the cushion for an airbag is unfolded, a high tenacity property capable of sufficiently supporting the sewing part in the cushion for an airbag may be secured.

In addition, the polyester yarn may have crystallinity of 40% to 60%, and preferably 45% to 55%. The crystallinity of the yarn needs to be 40% or more in order to maintain thermal shape stability of the sewing thread at the time of sewing the cushion for an airbag. When the crystallinity is more than 60%, a non-crystalline region is decreased to deteriorate impact-absorbing performance caused by the high temperature and high pressure gas of the inflator when the airbag is unfolded. Therefore, the crystallinity is preferably 60% or less.

Meanwhile, the polyester sewing thread for an airbag of the present invention is obtained by upper-twisting and lower-twisting (or lower-twisting and upper-twisting) the polyester yarn including the plurality of polyester filaments to prepare a 3 to 5 ply doubled and twisted thread, and bonding the doubled and twisted thread in the manner of in-bonding, out-bonding, or in-and-out bonding.

In the present invention, there are three main bonding manners of the sewing thread, that is, in-bonding, out-bonding, and in-and-out bonding manners, which are caused by differences in a bonding manner for exhibiting strong adhesion performance among the plurality of polyester filaments.

The in-bonding manner is to twist 3 or more strands of high tenacity and low modulus polyester yarn having a thickness of 60 to 850 denier as a main yarn of the sewing thread, and to double and twist the twisted polyester thread with a seam thread for bonding positioned in the center of the twisted high tenacity and low modulus polyester thread and having a thickness of 10 to 80 denier. In addition, the out-bonding manner is to perform bonding treatment at an outer part of the twisted high tenacity and low modulus polyester thread, through a polymer for bonding. In addition, the in-and-out bonding manner is to simultaneously perform the in-bonding and the out-bonding in order to exhibit stronger adhesion of the twisted polyester yarn. The sewing thread for an airbag is prepared by applying all three of the above-described manners.

The polyester sewing thread of the present invention obtained by doubling and twisting the specific polyester yarn and bonding the polyester yarn in the manner of in-bonding, out-bonding, or the in-and-out bonding may have excellent tensile strength, tensile elongation, seam strength, stiffness, and heat resistance properties, such that at the time of manufacturing the cushion for an airbag, excellent sewability may be exhibited, and when the cushion for an airbag is unfolded, excellent unfolding performance may be exhibited, as compared to the general industrial polyester sewing thread.

The polyester sewing thread of the present invention may have total fineness of 200 to 2,400 denier. The total fineness of the sewing thread needs to be 200 denier or more in order to secure strength for preventing rupture of a sewing binding part when the airbag is unfolded, and the total fineness of the sewing thread needs to be 2,400 denier or less in order to secure sufficient resistance (elasticity). The denier is a unit indicating a thickness of the yarn or the fiber, and a case in which a length of 9000 m corresponds to 1 g refers to 1 denier.

In the polyester sewing thread, a toughness index Y according to Calculation Formula 1 below may be 1.0 to 4.0, and preferably 1.3 to 3.7.

$$Y = (S \times E)/D \qquad \text{[Calculation Formula 1]}$$

In Calculation Formula 1, S represents tensile tenacity (N) of the sewing thread, as measured according to International Organization for Standardization, ISO 2062, E represents tensile elongation (%) of the sewing thread, as measured according to ISO 2062, and D represents total fineness (De) of the sewing thread, as measured according to American Society for Testing and Materials, ASTM D 204.

The toughness index Y of the polyester sewing thread refers to toughness of the sewing thread used for the cushion for an airbag, and the toughness index may be 1.0 or more so as to prevent a rip phenomenon of the sewing thread when the cushion for an airbag is unfolded, and may be 4.0 or less in view of stiffness and sewability of the sewing thread when the cushion for an airbag is manufactured.

When the toughness index Y of the sewing thread is less than 1.0, strength and elongation physical properties of the sewing thread are excessively low, or fineness is excessively high. As described above, when the strength is excessively low, the rip phenomenon or carbonization of the sewing thread may occur due to the high temperature and high pressure gas of the inflator when the airbag is unfolded. In addition, when the elongation physical property is low, the sewing thread itself is excessively rigid, such that loop formation at the time of sewing a round part of the cushion for an airbag is very poor, and it is difficult to adjust twist and tension balance in a process of preparing the sewing thread. Otherwise, when the fineness of the sewing thread is excessively high, rigidity of the sewing thread is increased, such that it is difficult to adjust tension balance during a sewing process, and it is difficult to perform loop formation.

Meanwhile, when the toughness index Y of the sewing thread is more than 4.0, strength and elongation physical properties of the sewing thread are excessively high, or fineness of the sewing thread is excessively low. As described above, when the strength and the elongation of the sewing thread are excessively high, damage caused by the high temperature and high pressure gas of the inflator when the airbag is unfolded may be decreased; however, a difference in toughness between the fabric and the sewing thread may occur, such that the fabric may be torn. In addition, when the fineness of the sewing thread is extremely low, heat resistance is not sufficient, such that the sewing thread may be easily melted by the gas of the inflator. Accordingly, the toughness index Y of the sewing thread as described above may preferably be about 1.0 to 4.0 in order to be effective as the sewing thread for an airbag.

In addition, the tensile tenacity (S) of the sewing thread measured by ISO 2062 may be 15 N or more or 15 N to 150 N, preferably 20 N or more, and more preferably 25 N or more. When the tensile tenacity of the sewing thread is less than 15 N, the strength of the sewing part is excessively weak, such that at the time of manufacturing or unfolding the airbag, the sewing part may be torn. Meanwhile, when tensile tenacity of the sewing thread is excessively large, the strength of the sewing part is excessively strong, such that at the time of unfolding the airbag, the airbag cushion may be rather seriously damaged or the shape of the sewing part may be abnormally unfolded.

In addition, the tensile elongation (E) of the sewing thread measured by ISO 2062 may be 10% or more or 10% to 40%, preferably 13% or more, and more preferably 15% or more. The tensile elongation of the sewing thread may be 10% or more in order to induce sufficient expansion at the sewing part together with expansion of the high temperature and high pressure gas of the inflator when the airbag is unfolded, and may be 40% or less in view of sewability and tension adjustment (seam puckering, knot yarn defect, float stitch, scission, margin seam defect, nipped fabric, overlap, and the like) of the sewing thread at the time of sewing the airbag cushion.

Relative comparison for heat resistance of the polyester sewing thread of the present invention may be conducted by a free-fall hot rod test. When a circular knitted fabric is prepared by using the sewing thread, and then a hot-rod having a temperature of 500 degrees Celsius freely falls onto the circular knitted fabric of the sewing thread, time (s) required for contacting the circular knitted fabric (two layers, width of 20 cm×length of 20 cm) and passing through the circular knitted fabric may be 0.3 seconds or more. In a case in which the high temperature and high pressure gas of the inflator is delivered to the sewing thread when the airbag cushion is actually unfolded, time needs to be 0.3 seconds or more in order to prevent melting and carbonization of the sewing thread in view of heat resistance of the sewing thread.

Meanwhile, according to another embodiment of the present invention, there is a preparation method of a polyester sewing thread for an airbag as described above. The preparation method of the polyester sewing thread may include doubling and twisting the polyester yarn including the plurality of polyester filaments, and bonding the polyester yarn in the manner of in-bonding, out-bonding, or in-and-out bonding.

In particular, the polyester yarn including the plurality of polyester filaments in the sewing thread for an airbag according to the present invention may have tensile strength of 7.8 g/d or more or 7.8 g/d to 11.0 g/d, and preferably 8.3 g/d or more or 8.3 g/d to 10.0 g/d. The tensile strength of the polyester yarn is a factor directly related to tensile tenacity of the sewing thread. When the tensile strength is less than 7.8 g/de, suitable tenacity for the sewing thread for an airbag may not be obtained, and the tensile strength is preferably 7.8 g/de or more in view of seam strength of the cushion for an airbag actually using the sewing thread of the present invention and shape stability when the airbag is fully unfolded. Further, in addition to the above-described high strength, the polyester yarn may have an elongation at break of 13% to 27%, and preferably 15% to 25%. In addition, the elongation at break of the polyester yarn is a factor directly related to elongation of the sewing thread. When the elongation at break is less than 13%, the sewing thread itself is excessively rigid and loop formation at the time of sewing a round part of the cushion for an airbag is significantly poor, and therefore the elongation at break needs to be 13% or more to adjust twist and tension balance in a process of preparing the sewing thread. Meanwhile, when the elongation at break of the polyester yarn is 27% or more, the sewing thread may be straightened due to tension generated in sewing, and puckering which is a phenomenon that fabric of the cushion for an airbag shrinks during a process in which the sewing thread is elongated and recovered after the loop formation may occur.

The polyester yarn may have dry heat shrinkage of 7% or less or 0.8% to 7%, preferably 6% or less, and more preferably 5.5% or less. Here, the dry heat shrinkage is a value obtained by measurement under condition in which a fixed load of 0.01 g/d is applied at 177° C. for 2 minutes. The yarn in the process of preparing the sewing thread for an airbag of the present invention is subjected to a number of heat treatments, and when the dry heat shrinkage of the yarn is more than 7%, strength of the sewing thread may be deteriorated due to excessive shrinkage during the heat treatment, and when the sewing thread is rigid, the loop formation at the time of sewing the round part of the cushion is deteriorated. The polyester yarn may have a boiling water shrinkage of 5% or less or 0.8% to 5%, preferably 4% or less, and more preferably 3% or less. Here, the boiling water shrinkage is a value obtained by performing heat treatment in boiling water at 95° C. for 30 minutes, applying a fixed load of 0.1 g/d, and measuring a yarn length change between pre-treatment and post-treatment. In the sewing thread of the present invention, the boiling water shrinkage of the yarn needs to be 5% or less in order to exhibit uniform color and excellent appearance of the sewing threads in an inner layer and an outer layer by preparation processes such as dyeing (for example, cheese package dyeing), and the like.

Further, the polyester yarn may have a melted heat capacity of 35 J/g or more or 35 to 62 J/g, preferably 38 J/g or more, and more preferably 41 J/g or more. The melted heat capacity refers to a value of melted heat capacity generated by raising the temperature of a 10 mg sample from 30° C. up to 280° C. at a heating rate of 10° C./min under a nitrogen atmosphere by using DSC equipment. The melted heat capacity of the polyester yarn is a factor directly affecting heat resistance of the sewing thread for an airbag. The polyester yarn including the plurality of polyester filaments needs to have a heat capacity of 35 J/g or more in order to not melt the sewing thread under the high temperature and high pressure gas of the inflator when the airbag is unfolded.

After the bonding of the polyester yarn, the preparation method of the polyester sewing thread according to the present invention may further include heat treating and ironing the sewing thread after the bonding process is finished, dyeing the sewing thread after the heat treating and ironing processes are finished, lubricating the sewing thread after the dyeing process is finished, and final-winding the sewing thread after the lubricating process is finished.

In particular, the polyester sewing thread having total fineness of 200 to 2400 denier may be prepared by doubling and twisting the specific polyester yarn and bonding the polyester yarn in the manner of in-bonding, out-bonding, or in-and-out bonding according to the above-described processes. The polyester sewing thread as prepared above may have remarkably improved physical properties such as tensile strength, elongation, seam strength, heat resistance, and the like, and may provide optimum physical properties in sewing at the time of manufacturing the cushion for an airbag as described above.

Detailed description of each step of the above-described preparation method of the polyester sewing thread is as follows.

In the polyester sewing thread of the present invention, first, the polyester yarn including the plurality of polyester filaments may be doubled and twisted by twist processes using a complex twisting machine.

The three strands or more of polyester main yarns are firstly subjected to upper-twist (initial-twist) at a twisting degree of 250 to 700 TPM in an S direction (counter clockwise), and the seam thread for bonding is injected into the center of the upper-twisted main yarn, followed by lower-twist at a twisting degree of 200 to 600 TPM in a Z direction (clockwise), thereby finally performing doubling and twisting process. Here, there are an in-bonding manner in which a seam thread for bonding is injected into the center of the upper-twisted main yarn, an out-bonding manner in which a polymer for bonding is coated on the outside of the upper-twisted main yarn without injecting the seam thread, or an in-and-out bonding manner in which the in-bonding is performed and then the out-bonding is also performed.

As the seam thread for bonding to be injected in the center of the main yarn in the in-bonding manner or the in-and-out bonding manner, a low melting point polymer yarn, for example, low melting point polyester-based and polyolefin-based yarns, may be used. The low melting point polymer yarn may have a melting point of 150° C. to 220° C., and preferably 160 to 210° C., and a total fineness of 20 denier to 100 denier, and preferably 25 denier to 90 denier. In addition, a polymer resin for bonding which is coated on the outside of the main yarn in the out-bonding manner or the in-and-out bonding manner may be low melting point polyester-based and polyolefin-based resins. The low melting point polymer resin may have a melting point of 150° C. to 220° C., and preferably 160 to 210° C.

The process of bonding the polyester yarn in the manner of in-bonding, out-bonding, or in-and-out bonding in the present invention may be performed by thermosetting at a temperature of 170 to 240° C. or 175 to 230° C.

Then, the polyester sewing thread after the doubling and twisting process is finished is subjected to heat treatment and ironing processes to be a final bonding thread type, followed by dyeing and washing processes, and lubrication and winding processes using a liquid lubricant in order to secure lubricity of the sewing thread. Here, the dyeing process may be performed under normal pressure or high pressure in a range of 100 to 135° C.

In addition, physical properties of the polyester yarn and the finally prepared sewing thread used in the preparation method of the sewing thread for an airbag according to the present invention are as described above.

Meanwhile, according to another embodiment of the present invention, an airbag cushion including the polyester sewing thread is provided.

In the airbag cushion of the present invention, the polyester sewing thread obtained by doubling, twisting, and bonding the polyester yarn having high strength, middle elongation, and dry heat shrinkage as described above is used to secure excellent durability and heat resistance even under severe conditions of high temperature and high pressure, thereby preventing gas leakage and improving air tightness when the airbag is unfolded, while simultaneously securing excellent shape stability.

In addition, the airbag cushion may include the sewing binding parts in which the polyester sewing threads are sewed on the fabric for an airbag at predetermined intervals and connection nodes among the binding parts. The polyester sewing thread may be applied to sewing for tab or reinforcing materials of a one piece woven (OPW) type of side curtain airbag cushion as well as a plain fabric part of a general airbag cushion.

The fabric in the cushion for an airbag of the present invention may be both of a fabric or a non-woven fabric that is known to be generally usable, and is not particularly limited in view of a kind. For example, the fabric or the non-woven fabric may include at least one fiber selected from the group consisting of Nylon 66, polyethylene terephthalate (PET), and polypropylene (PP).

The fabric or non-woven fabric used in the present invention may be prepared according to a general preparation method, and may be selected so as to satisfy the above-described conditions of the cushion for an airbag among general fabrics or non-woven fabrics. If needed, the cushion for an airbag of the present invention may be obtained by performing general weaving, scouring, and heat setting processes to prepare a fabric for an airbag cushion, and processing the fabric through additional processes such as silicone rubber coating and the like. The coated fabric for an airbag cushion as described above is subjected to cutting and backstitch processes to be manufactured into the airbag cushion having a predetermined shape. The airbag cushion is not specifically limited in view of a shape, but may be manufactured in a general shape.

The sewing binding part using the polyester sewing thread in the airbag cushion of the present invention may be prepared by selecting sewing methods effectively according to the usage for each part, and by adjusting the number of stitches at an optimum range by sewing methods such as single lock, double lock, single chain, double chain, and the like. For example, the number of stitches in the sewing binding part may be 20 to 60 ea/100 mm, and preferably 25 to 55 ea/100 mm. The number of stitches of the sewing binding part may be 20 ea/100 mm or more, that is, 20 or more per 100 mm, or 20 or more per 0.1 m, in order to secure sufficient strength so that the sewing part is not torn when the airbag is manufactured or is unfolded, and may be 60 ea/100 mm or less, that is, 60 or less per 100 mm, or 60 or less per 0.1 m in order to prevent damage of the fabric at the sewing part and prevent abnormal unfolding when the airbag is expanded.

The sewing binding part of the cushion for an airbag may have seam strength of 900 N to 2500 N, and preferably 1,000 N to 2350 N, as measured according to ASTM D 5822. In addition, the sewing thread may have elongation of 10% to 40%, and preferably 13% to 38%, as measured according to ISO 2062. Preferably, the sewing binding part of the cushion for an airbag according to the present invention maintains the seam strength and the elongation at the above-described range in order to and secure optimum range of strength of the sewing part.

In addition, the present invention provides an airbag system including the cushion for an airbag. The airbag system may be equipped with a conventional apparatus that is well-known to a person skilled in the art. The airbag may be largely divided into a front airbag and a side airbag. The front airbag includes airbags for a driver's seat, a passenger's seat, knee protection, ankle protection, and the like, and the side airbag includes a side airbag and a curtain airbag for a vehicle. Accordingly, the airbag of the present invention includes the front airbag, the side airbag, or the curtain airbag.

In the present invention, since matters other than the above description may be adjustable as necessary, they are not particularly limited in the present invention.

Hereinafter, preferred examples are presented in order to help a better understanding of the present invention, however, the following examples are only illustrative of the present invention, and do not limit the scope of the present invention.

EXAMPLE

Example 1

A polyester filament yarn was prepared from a PET chip having an intrinsic viscosity of 1.5 dl/g by a melt spinning machine under conditions of a spinning temperature of 295° C., an elongation ratio of 5.8, and a heat treatment temperature of 230° C. as a first step. The prepared polyester yarn had strength of 9.1 g/de, elongation of 18%, dry heat shrinkage of 5.5%, boiling water shrinkage of 1%, and melted heat capacity of 45 J/g. In addition, the polyester yarn had a denier per filament of 3.47 DPF and total fineness of 500 denier, and the number of filaments F was 144.

Three strands of the polyester filament yarns were upper-twisted at an upper-twist at 480 TPM by using a complex twisting machine, respectively. The upper-twisted yarns and a low melting point polyester yarn (30 denier) having a melting point of 190° C. as a seam thread for bonding were subjected to lower-twist at 370 TPM to perform a doubling and twisting process, followed by a heat treatment and ironing process at 190° C., thereby obtaining a polyester bonding thread prepared in the manner of in-bonding.

The bonding thread was dyed by a high pressure dyeing process, washed, and then immersed in a bath containing a softener diluted in water at a ratio of 1:2.2 so that the lubricant had a content of 5.5 for lubrication, and dried, thereby preparing a final polyester sewing thread for an airbag.

Example 2

A polyester sewing thread was prepared by the same method as Example 1, except for using a low melting point polyester yarn (60 denier) having a melting point of 190° C. as a seam thread for bonding.

Example 3

A polyester filament yarn having strength of 9.4 g/de, elongation of 15%, dry heat shrinkage of 3%, boiling water shrinkage of 1.5%, and melted heat capacity of 42 J/g was prepared by the same method as Example 1. Here, the polyester yarn had a denier per filament of 3.47 DPF and total fineness of 500 denier, and the number of filaments F was 144.

Three strands of the polyester filament yarns were upper-twisted at an initial-twist at 480 TPM by using a complex twisting machine, respectively. The upper-twisted yarns and a low melting point polyester yarn (30 denier) having a melting point of 190° C. were subjected to lower-twist at 370 TPM to perform a doubling and twisting process, and then a thermoplastic polyurethane resin having a melting point of 210° C. was coated on an outer side of the doubled and twisted thread. The resin-coated doubled and twisted thread as prepared above was subjected to a heat treatment and ironing process at 190° C., thereby obtaining a polyester bonding thread prepared in the manner of in-and-out bonding.

The bonding thread was dyed by a high pressure dyeing process, washed, and then immersed into a bath containing a softener diluted in water at a ratio of 1:2.2 so that the lubricant had a content of 5.5 for lubrication, and dried, thereby preparing a final polyester sewing thread for an airbag.

Comparative Example 1

A polyester filament yarn having strength of 7.5 g/de and elongation of 13% was prepared from a PET chip having an intrinsic viscosity of 0.9 dl/g by a melt spinning machine under conditions of a spinning temperature of 302° C., an elongation ratio of 4.8, and a heat treatment temperature of 230° C. as a first step. Here, the polyester yarn had a denier per filament of 3.47 DPF and total fineness of 500 denier, and the number of filaments F was 144.

Three strands of the polyester filament yarns were upper-twisted at an initial-twist at 570 TPM by using a complex twisting machine, respectively. The upper-twisted yarns and a low melting point polyester yarn (30 denier) having a melting point of 190° C. were subjected to lower-twist at 450 TPM to perform a doubling and twisting process, followed by a heat treatment and ironing process at 190° C., thereby obtaining a polyester bonding thread prepared in the manner of in-bonding.

The bonding thread was dyed by a high pressure dyeing process, washed, and then immersed into a bath containing a softener diluted in water at a ratio of 1:2.2 so that the lubricant had a content of 3.5 for lubrication, and dried, thereby preparing a final polyester sewing thread for an airbag.

Comparative Example 2

A polyester sewing thread was prepared by the same method as Comparative Example 1, except for using a low melting point polyester yarn (60 denier) having a melting point of 190° C. as a seam thread for bonding.

Comparative Example 3

A polyester filament yarn having strength of 7.5 g/de and elongation of 13% was prepared by the same method as Comparative Example 1. Here, the polyester yarn had a denier per filament of 3.47 DPF and total fineness of 500 denier, and the number of filaments F was 144.

Three strands of the polyester filament yarns were upper-twisted at an initial-twist at 480 TPM by using a complex twisting machine, respectively. The upper-twisted yarns and a low melting point polyester yarn (30 denier) having a melting point of 190° C. as a seam thread for bonding were subjected to lower-twist at 370 TPM to perform a doubling and twisting process, and then a thermoplastic polyurethane resin having a melting point of 210° C. was coated on an outer side of the doubled and twisted thread. The resin-coated doubled and twisted thread as prepared above was subjected to a heat treatment and ironing process at 190° C., thereby obtaining a polyester bonding thread prepared in the manner of in-and-out bonding.

The bonding thread was dyed by a high pressure dyeing process, washed, and then immersed into a bath containing a softener diluted in water at a ratio of 1:2.2 so that the lubricant had a content of 3.5 for lubrication, and dried, thereby preparing a final polyester sewing thread for an airbag.

Comparative Example 4

A polyester filament yarn having strength of 8.0 g/de and elongation of 11%, dry heat shrinkage of 8.0%, boiling water shrinkage of 0.7%, and melted heat capacity of 32 J/g was prepared from a PET chip having an intrinsic viscosity of 1.0 dl/g by a melt spinning machine under conditions of a spinning temperature of 300° C., an elongation ratio of 6.1, and a heat treatment temperature of 210° C. Here, the polyester yarn had a denier per filament of 5.20 DPF and total fineness of 500 denier, and the number of filaments F was 96.

Three strands of the polyester filament yarns were initial-twisted at an upper-twist at 400 TPM by using a complex twisting machine, respectively, and lower-twisted at 330 TPM, thereby preparing a doubled and twisted thread. Then, a thermoplastic polyurethane resin having a melting point of 210° C. was coated on an outer side of the doubled and twisted thread, and subjected to heat treatment and ironing process at 190° C., thereby obtaining a polyester bonding thread prepared in the manner of out-bonding.

The bonding thread was dyed by a high pressure dyeing process, washed, and then immersed into a bath containing a softener diluted in water at a ratio of 1:2.2 so that the lubricant had a content of 5.5 for lubrication, and dried, thereby preparing a final polyester sewing thread for an airbag.

Comparative Example 5

A polyester filament yarn having strength of 9.4 g/de and elongation of 19%, dry heat shrinkage of 5.7%, boiling water shrinkage of 1.2%, and melted heat capacity of 48 J/g was prepared from a PET chip having an intrinsic viscosity of 1.7 dl/g by a melt spinning machine under conditions of a spinning temperature of 300° C., an elongation ratio of 5.9, and a heat treatment temperature of 240° C. as a first step. Here, the polyester yarn had a denier per filament of 3.47 DPF and total fineness of 500 denier, and the number of filaments F was 144.

Three strands of the polyester filament yarns were initial-twisted at an upper-twist at 515 TPM by using a complex twisting machine, respectively. A polyester sewing thread was prepared by the same method as Example 1, except that the upper-twisted yarns and a low melting point polyester yarn (90 denier) having a melting point of 190° C. as a seam thread for bonding were subjected to lower-twist at 400 TPM to perform a doubling and twisting process, followed by a heat treatment and ironing process at 190° C., thereby obtaining a polyester bonding thread prepared in the manner of in-bonding.

Various physical properties of the polyester sewing threads prepared by Examples 1 to 3 and Comparative Examples 1 to 5 were measured as follows, and measured physical properties are shown in Table 1 below.

a) Heat Resistance

Figure 6:
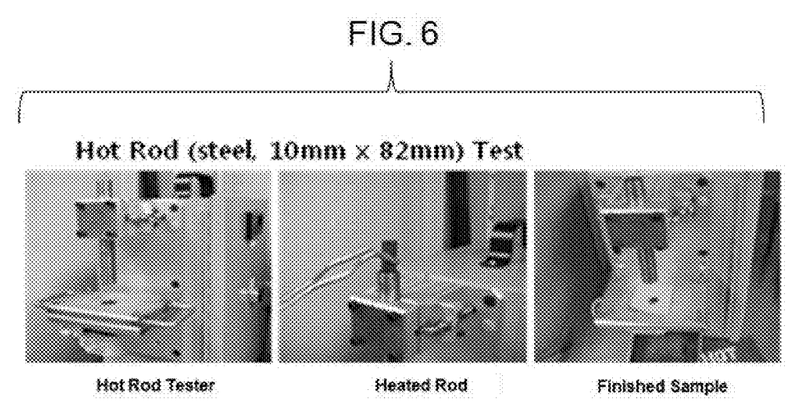
FIG. 6 is a configuration diagram of a hot rod tester measuring heat resistance of the polyester sewing thread according to the present invention.

As shown in FIG. 6, heat resistance of the sewing thread was measured by a free-fall hot rod test.

b) Total Fineness

Total fineness D of the sewing thread was measured by ASTM D 204.

c) Tensile Tenacity and Elongation

Tensile tenacity and elongation of the sewing thread were measured by ISO 2062.

d) Toughness Index (Y)

Toughness index Y of the sewing thread was calculated by Calculation Formula 1 below based on tensile tenacity S, elongation E, and total fineness D of the sewing thread measured as described above.

$$Y=(S\times E)/D \quad \text{[Calculation Formula 1]}$$

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Kind of sewing thread | 500D/3P | 500D/3P | 500D/3P | 500D/3P | 500D/3P | 500D/3P | 500D/3P | 500D/3P |
| Total fineness of sewing thread (D, De) | 1750 | 1750 | 1750 | 1750 | 1750 | 1750 | 1750 | 1750 |
| Heat resistance (s, at 500° C.) | 0.75 | 0.75 | 0.83 | 0.45 | 0.45 | 0.45 | 0.50 | 0.77 |

TABLE 1-continued

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Tensile tenacity (S, N) | 105 | 107 | 120 | 88 | 89 | 89 | 90 | 155 |
| Tensile elongation (E, %) | 25 | 26 | 33 | 17 | 17 | 18 | 13 | 43 |
| Toughness index (Y) | 1.5 | 1.59 | 2.26 | 0.85 | 0.86 | 0.92 | 0.67 | 4.43 |

As shown in Table 1 above, it was confirmed that the polyester sewing threads of Examples 1 to 3 prepared by doubling and twisting the specific polyester yarns having high strength, middle elongation, and low dry heat shrinkage all had excellent heat resistance, tensile tenacity, tensile elongation, and toughness index in optimum ranges. In particular, it could be appreciated that the polyester sewing threads of Examples 1 to 3 exhibited similar tensile tenacity and elongation to the existing nylon sewing thread for an airbag, such that toughness of the sewing thread itself was increased, and when the airbag was unfolded, the sewing part was not damaged, which is excellent.

Meanwhile, it was confirmed that the polyester sewing threads of Comparative Examples 1 to 5 did not satisfy these properties. In particular, it could be appreciated that all of physical properties of the polyester sewing threads of Comparative Examples 1 to 4 were remarkably deteriorated. The polyester sewing thread of Comparative Example 5 exhibited similar heat resistance and the like to those of Examples 1 to 3; however, the toughness index Y of the sewing thread was 4.43, which was out of the optimum range, and therefore defects in unfolding the airbag could occur due to gas leakage and the like caused by fabric damage at the time of manufacturing the final cushion for an airbag.

Preparation Examples 1 to 3 and Comparative Preparation Examples 1 to 5

A silicone coated fabric obtained by weaving a fabric at a 49×49 density by using a polyester yarn having total fineness of 1750 denier and then performing scouring and heat setting processes was used as a fabric for an airbag cushion.

The fabric for an airbag cushion was cut by a laser cutter, followed by backstitching in a single lock method so that the number of stitches was 35 ea/100 mm using two strands of the polyester sewing threads prepared by Examples 1 to 3 and Comparative Examples 1 to 5, to perform a sewing and bonding process on an inter-cushion, a cushion itself such as tether and the like, and an auxiliary component part, thereby manufacturing a cushion for an airbag.

The remaining processes for manufacturing the cushion for an airbag were followed general conditions for manufacturing the polyester cushion for an airbag.

Various physical properties of the polyester cushions for an airbag manufactured by Preparation Examples 1 to 3 and Comparative Preparation Examples 1 to 5 were measured as follows, and measured physical properties were shown in Table 2 below.

1) Seam Strength

The seam strength of the airbag cushion was measured by using a measurement and an apparatus according to an Autoliv fabric for an airbag specification E668992 test standard.

2) Weaving Quality

Weaving ability of the sewing part of the airbag cushion after sewing was performed was confirmed with the naked eye, and a case in which sewing defects such as float stitch, scission, knot yarn defect, margin seam defect, fabric, overlap, and the like did not occur was evaluated as "normal," a case in which the sewing thread during the sewing process was broken was evaluated as "thread breakage," and a case in which some filaments during the sewing process was broken was evaluated as "fluff." In addition, a case in which composite defects such as non-uniform loop formation, wrinkled fabric, and the like related to shape stability of the sewing thread occurred was evaluated as "defect."

TABLE 2

|  | Preparation Example 1 | Preparation Example 2 | Preparation Example 3 | Comparative Preparation Example 1 | Comparative Preparation Example 2 | Comparative Preparation Example 3 | Comparative Preparation Example 4 | Comparative Preparation Example 5 |
|---|---|---|---|---|---|---|---|---|
| Kinds of fabric | Coated fabric | Coated fabric | Coated fabric | Coated fabric | Coated fabric | Coated fabric | Coated fabric | Coated fabric |
| Weaving density of fabric | 49 × 49 | 49 × 49 | 49 × 49 | 49 × 49 | 49 × 49 | 49 × 49 | 49 × 49 | 49 × 49 |
| Kinds of sewing thread | Example 1 | Example 2 | Example 3 | Comparative Example 1 | Comparative Example 2 | Comparative Example 3 | Comparative Example 4 | Comparative Example 5 |
| Total fineness of sewing thread (D) | 1750 | 1750 | 1750 | 1750 | 1750 | 1750 | 1750 | 1750 |
| Sewing method | Single Lock | Single Lock | Single Lock | Single Lock | Single Lock | Single Lock | Single Lock | Single Lock |
| Number of stitches (ea/10 cm) | 35 | 35 | 35 | 35 | 35 | 35 | 35 | 35 |
| Seam strength (N) | 1250 | 1260 | 1280 | 830 | 835 | 850 | 850 | 1470 |
| Evaluation of sewability | Normal | Normal | Normal | Thread breakage | Fluff | Fluff | Fluff | Defect |

As shown in Table 2 above, it was confirmed that the airbag cushion of Preparation Examples 1 to 3 using the polyester sewing threads of Examples 1 to 3 according to the present invention exhibited excellent sewability as well as seam strength.

Meanwhile, it was confirmed that the airbag cushions of Comparative Preparation Examples 1 to 5 using the polyester sewing threads of Comparative Examples 1 to 5 did not satisfy these properties. In particular, all of the airbag cushions of Comparative Preparation Examples 1 to 5 had low seam strength, and quality problems occurred during the sewing process. In addition, the airbag cushion of Comparative Preparation Example 5 had problems such as wrinkled fabric as well as non-uniform loop formation related to the shape stability of the sewing thread.

Experimental Example

An airbag for a vehicle of a curtain-type airbag (C&S type) cushion assembly for protecting passenger's head at a side in the vehicle was manufactured by using the airbag cushions manufactured by Preparation Examples 1 to 3 and Comparative Preparation Examples 1 to 5. A static unfolding performance test (static test) was performed on the completed airbag for a vehicle, under three heat treatment conditions (room temperature: being left in the oven at 25° C.×4 h, hot: being left in the oven at 85° C.×4 h, and cold: being left in the oven at −30° C.×4 h).

As a result of the static unfolding performance test (static test), a case in which sewing thread breakage, sewing thread fusion, sewing thread carbonation, expansion (gap) between sewing stitches, and pushed sewing thread did not occur was evaluated as "pass," and a case in which any one of the above-mentioned phenomenon occurred was evaluated as "fail." Here, the airbag cushion evaluated as "pass" in the static test result was usable; however, the airbag cushion evaluated as "fail" in the static test result was not usable.

The static unfolding performance test (static test) results of the airbag cushions manufactured by Preparation Examples 1 to 3 and Comparative Preparation Examples 1 to 5 are shown in Table 3 below.

performing both of the static unfolding performance test (static test) and upper limit test, sewing thread breakage, sewing thread fusion, sewing thread carbonation, expansion (gap) between sewing stitches, pushed sewing thread, and the like did not occur, such that all of the airbags for a vehicle including the airbag cushions of Preparation Examples 1 to 3 had excellent performance as an airbag for a vehicle.

Here, the static unfolding performance test (static test), which is the most basic unfolding test for evaluation of the initially designed airbag cushion, is conducted only in a module state in which the airbag cushion is installed, and processed under the most normal temperature and unfolding pressure for the inflator. The airbag cushion evaluated as "pass" in the static unfolding performance test (static test) may be applied for mass-production as a cushion for an airbag.

Meanwhile, in the static unfolding performance test (static test) of the airbags for a vehicle including the airbag cushions of Comparative Preparation Examples 1 to 4, all of the cushions were evaluated as "fail" due to sewing thread damage, sewing thread expansion, or sewing thread carbonization when the airbag was unfolded. In addition, in the static unfolding performance test (static test) of the airbag for a vehicle including the airbag cushion of Comparative Preparation Example 5, the sewing thread had excessively high rigidity, such that a large amount of the fabric around the sewing part was torn. Accordingly, it could be appreciated that the airbags for a vehicle including the airbag cushions of Comparative Preparation Examples 1 to 5 were not usable as an airbag in practice.

In particular, in the static test of the CAB (C&S) cushion assembly including the airbag cushion of Comparative Preparation Example 1, sewing threads at the outer sewing part and at the tether sewing part of the cushion were serious

TABLE 3

| | Cushion specification | Powder-type Inflator Pressure (kPa) | Powder-type Inflator Temperature (° C.) | Room temperature Static test (Static) | Hot Static test (Static) | Cold Static test (Static) |
|---|---|---|---|---|---|---|
| Preparation Example 1 | CAB (C&S) | 230 | 320 | Pass | Pass | Pass |
| Preparation Example 2 | CAB (C&S) | 230 | 320 | Pass | Pass | Pass |
| Preparation Example 3 | CAB (C&S) | 230 | 320 | Pass | Pass | Pass |
| Comparative Preparation Example 1 | CAB (C&S) | 230 | 320 | Fail | Fail | Fail |
| Comparative Preparation Example 2 | CAB (C&S) | 230 | 320 | Fail | Fail | Fail |
| Comparative Preparation Example 3 | CAB (C&S) | 230 | 320 | Fail | Fail | Fail |
| Comparative Preparation Example 4 | CAB(C&S) | 230 | 320 | Fail | Fail | Fail |
| Comparative Preparation Example 5 | CAB (C&S) | 230 | 320 | Fail | Fail | Fail |

As shown in Table 3 above, it could be appreciated that as a result obtained by leaving the airbags for a vehicle including the airbag cushions of Preparation Examples 1 to 3 according to the present invention in the oven under three heat treatment temperature conditions, respectively, and damaged. In addition, in the airbag cushion of Comparative Preparation Example 3, the expansion as well as damage of sewing thread at the sewing entrance part of the inflator seriously occurred.

In addition, in the static test of airbags for a vehicle including the airbag cushions of Comparative Preparation Examples 1 to 4, quality defects of the sewing thread occurred since physical properties of the yarn itself used for the polyester sewing thread were basically and significantly low. Meanwhile, in the static test of airbags for a vehicle including the airbag cushion of Comparative Preparation Example 5, physical properties of the sewing thread were excellent; however, the physical properties were too high to be used for a sewing thread for an airbag, which caused serious damage to the fabric. In addition, performance as the airbag cushion even under a short time of heat treatment conditions at room temperature, high temperature, and low temperature was not satisfied, such that upon vehicle collision accident after being stored for a long period of time at a high temperature, safety of passengers may not be guaranteed at all.

What is claimed is:

1. A polyester sewing thread for an airbag, wherein the sewing thread is a bond thread containing a ply of at least three twisted polyester yarns,
   wherein the respective individual twisted polyester yarn includes a plurality of polyester filaments and has tensile strength of 7.8 g/d or more, elongation at break of 13% to 27%, dry heat shrinkage of 7% or less, boiling water shrinkage of 5% or less, and melted heat capacity of 35 J/g or more,
   wherein a toughness index Y of the polyester sewing thread according to Calculation Formula 1 below is 1.0 to 4.0:

$$Y=(S \times E)/D \qquad \text{Calculation Formula 1}$$

in Calculation Formula 1, S represents tensile tenacity N of the polyester sewing thread, E represents tensile elongation (%) of the polyester sewing thread, and D represents a total fineness (denier) of the polyester sewing thread,
   wherein the dry heat shrinkage is a value obtained by measurement under condition in which a fixed load of 0.01 g/d is applied at 177° C. for 2 minutes; the boiling water shrinkage is a value obtained by performing heat treatment in boiling water at 95° C. for 30 minutes, applying a fixed load of 0.1 g/d, and measuring a yarn length change between pre-treatment and post-treatment; and the melted heat capacity is a value of melted heat capacity generated by raising the temperature of a 10 mg sample from 30° C. up to 280° C. at a heating rate of 10° C./min under a nitrogen atmosphere by using DSC equipment, and
   wherein the bond thread is obtained by
      providing at least three twisted polyester yarns, wherein the respective individual twisted polyester yarn includes a plurality of polyester filaments,
      doubling and twisting the at least three twisted polyester yarns to give a ply of the at least three twisted polyester yarns; and
      subjecting the ply to a bonding using an in-bonding, an out-bonding, or an in-and-out-bonding to give the bond thread, wherein the in-bonding is carried out by placing a bonding polymer yarn having a melting point of 160° C. to 210° C. as an internal seam of the ply of the twisted polyester yarns, followed by applying heat; the out-bonding is carried out by coating an outer side of a ply of the twisted polyester yarns with a polymer resin having a melting point of 160° C. to 210° C.; and wherein the in-and-out-bonding is carried out by performing both of the in-bonding and the out-bonding.

2. The polyester sewing thread for an airbag of claim 1, wherein the polyester sewing thread has total fineness of 200 to 2,400 denier.

3. The polyester sewing thread for an airbag of claim 1, wherein the polyester yarn has a denier per filament of 2.0 to 8.0 DPF, and includes 20 to 180 filaments.

4. The polyester sewing thread for an airbag of claim 1, wherein the polyester yarn has a number average molecular weight of 100,000 to 250,000.

5. The polyester sewing thread for an airbag of claim 1, wherein the polyester yarn has an intrinsic viscosity of 0.8 dl/g or more.

6. The polyester sewing thread for an airbag of claim 1, wherein the polyester yarn has crystallinity of 40% to 60%.

7. The polyester sewing thread for an airbag of claim 1, wherein the polyester yarn has an initial modulus of 40 to 120 g/d.

8. A preparation method of a polyester sewing thread for an airbag according to claim 1, the preparation method comprising:
   providing at least three twisted polyester yarns, wherein the respective individual twisted polyester yarn includes a plurality of polyester filaments,
   doubling and twisting the at least three twisted polyester yarns to give a ply of the at least three twisted polyester yarns; and
   subjecting the ply to a bonding using an in-bonding, an out-bonding, or an in-and-out-bonding to give a bond thread,
   wherein the in-bonding is carried out by placing a bonding polymer yarn having a melting point of 160° C. to 210° C. as an internal seam of the ply of the twisted polyester yarns, followed by applying heat; the out-bonding is carried out by coating an outer side of a ply of the twisted polyester yarns with a polymer resin having a melting point of 160° C. to 210° C.; and wherein the in-and-out-bonding is carried out by performing both of the in-bonding and the out-bonding,
   wherein the bonding polymer yarn has total fineness of 30 to 60 denier,
   wherein the polyester yarn has tensile strength of 7.8 g/d or more, elongation at break of 13% to 27%, dry heat shrinkage of 7% or less, boiling water shrinkage of 5% or less, and melted heat capacity of 35 J/g or more, and
   wherein the dry heat shrinkage is a value obtained by measurement under condition in which a fixed load of 0.01 g/d is applied at 177° C. for 2 minutes; the boiling water shrinkage is a value obtained by performing heat treatment in boiling water at 95° C. for 30 minutes, applying a fixed load of 0.1 g/d, and measuring a yarn length change between pre-treatment and post-treatment; and the melted heat capacity is a value of melted heat capacity generated by raising the temperature of a 10 mg sample from 30° C. up to 280° C. at a heating rate of 10° C./min under a nitrogen atmosphere by using DSC equipment.

9. The preparation method of claim 8, wherein a twisting degree of the ply of the at least three twisted polyester yarns is 200 to 700 TPM.

10. The preparation method of claim 8, wherein the in-and-out-bonding is performed by
   doubling and twisting the at least three twisted polyester yarns with a bonding polymer yarn, as an internal seam, said bonding polymer yarn having a melting point of 160° C. to 210° C.;

coating an outer surface of thus obtained doubled and twisted polyester yarns with a polymer resin having a melting point of 160° C. to 210° C.; and applying heating to the polyester yarns to obtain a bond thread.

* * * * *